May 19, 1953  J. LINDSTROM  2,638,865
WEIGHING METER

Filed Jan. 7, 1950  2 Sheets-Sheet 1

INVENTOR.
John Lindstrom
BY
Frank A. Bower
ATTORNEY

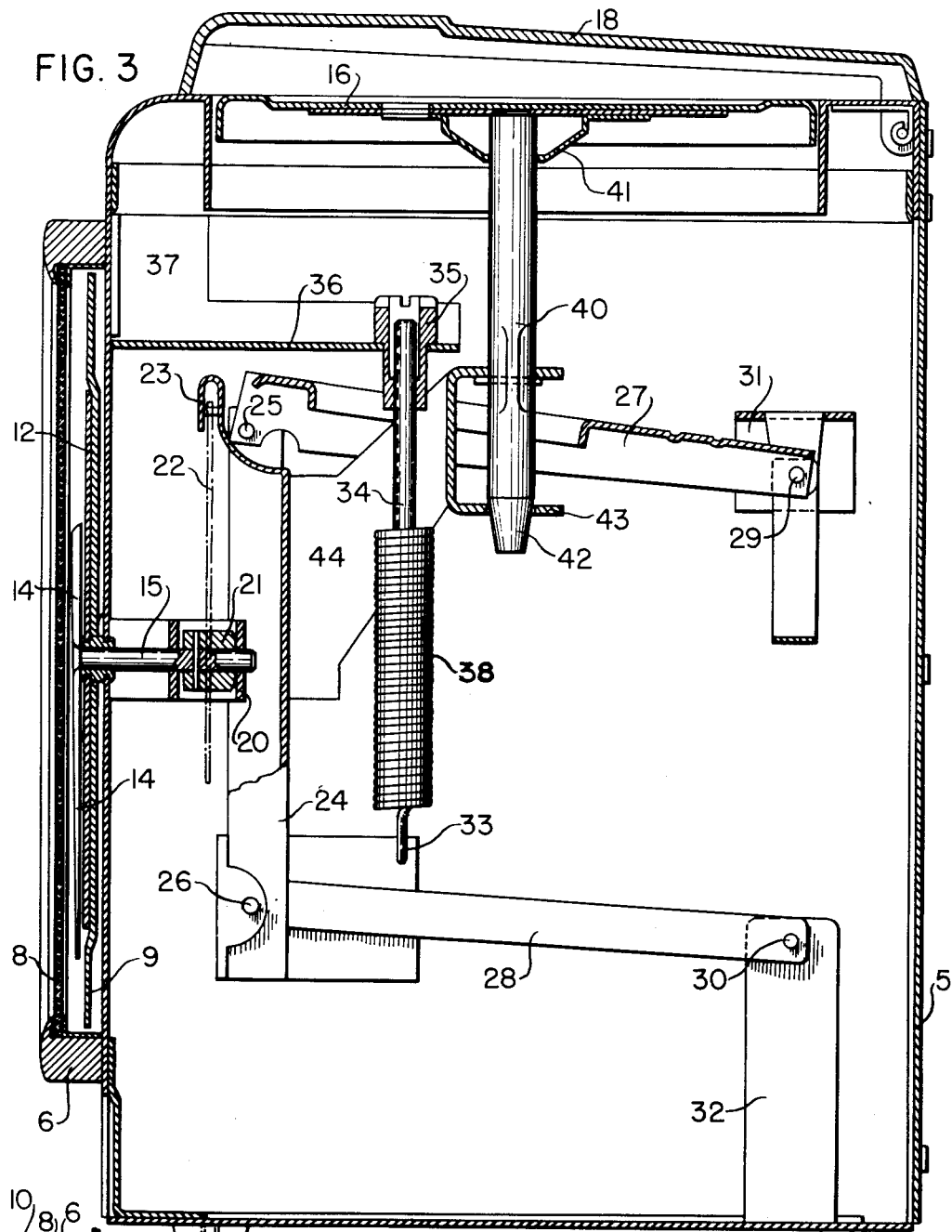

Patented May 19, 1953

2,638,865

UNITED STATES PATENT OFFICE 2,638,865

WEIGHING METER

John Lindstrom, Montclair, N. J., assignor to The Viking Tool & Machine Corporation, Belleville, N. J., a corporation of New Jersey Application January 7, 1950, Serial No. 137,449

1 Claim. (Cl. 116—129)

This invention relates to weighing meters and particularly to meters for indicating the fluid contents of containers such as bottles partially filled with liquor.

The object of the invention is to provide a weighing meter which will be simple and inexpensive in manufacture and rugged and accurate in service.

Figure 2:
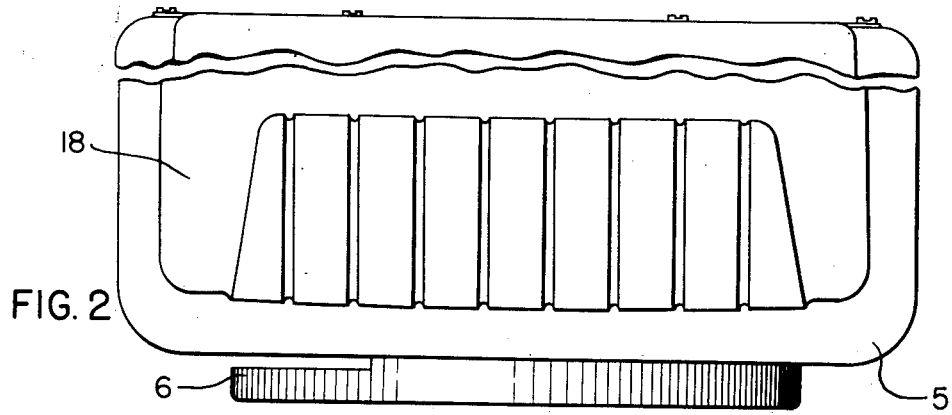
Figure 1:
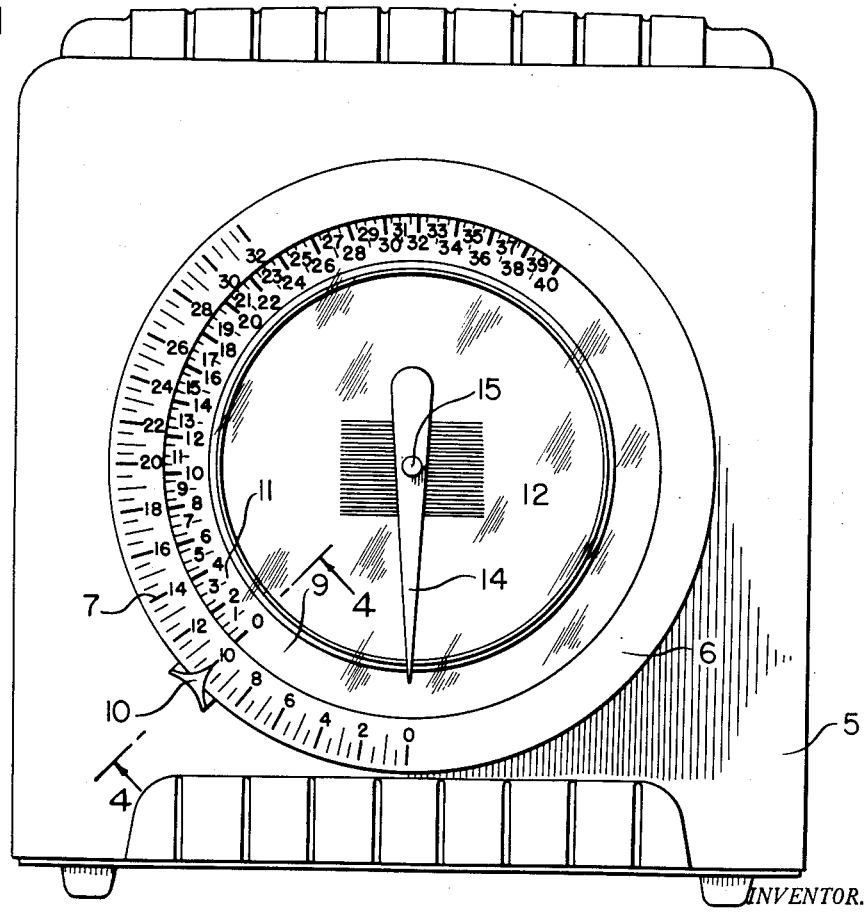

Further objects of the invention, particularly in the combination of scales and actuating parts providing for convenient manipulation of the movable parts and clear visibility of the scales, will appear from the following specification taken in connection with the accompanying drawing in which Fig. 1 is an elevational face view of the meter, Fig. 2 is a plan view with parts broken away, Fig. 3 is a vertical sectional view in the plane of the needle axis, and Fig. 4 is a detail section on line 4—4 of Fig. 1.

In the meter shown, the casing 5 holds the scale mechanism and has on its front an outer annulus 6 marked with outer scale gradations 7 and housing the glass disk 8. An inner rotatable scale disk 9 turns on the axis of the needle shaft 15 and carries the gradations of inner scale 11. Attached to disk 9 at the zero mark of scale 11 is a finger piece or pointer 10 extending outward and curved over to register at its tip with scale 7 so that the inner scale 11 may be moved to bring its zero mark into register with the gradations of outer scale 7.

The needle 14 of the meter is actuated by the total weight of a bottle placed on platform 16, cover 18 having been opened, and this movement of needle 14 from the zero of scale 7 corresponds in displacement to the weight of the bottle, tare, plus the weight of the liquid content. If then annulus 9 with scale 11 is moved to bring the zero of scale 11 to register with that mark of fixed scale 7 corresponding to the bottle tare, this tare will be automatically deducted from the reading of the needle on the inner scale 11.

For instance, the scale settings as shown (Fig. 1) are for a bottle tare of 10 ounces so that the needle will read the liquid content in fluid ounces on scale 11, when the bottle is set on the meter platform 16. It is only necessary to set each bottle in turn on the platform, correspondingly set the tare by pointer 10 on scale 7 and then read off the liquid content on scale 11.

The meter is neat in appearance, convenient in handling and the operating mechanism is completely housed and ruggedly supported. The needle shaft 15 is journaled in fixed bracket 20 and carries pinion 21 actuated by rack 22 guided vertically in bracket 20 and pivotally connected at 23 to the vertical beam 24 linked by pivots 25, 26 to the forward ends of arms 27, 28 pivoted at 29, 30 in fixed brackets 31, 32 and supported at 33 by spring 38 suspended from rod 34 screw threaded in adjusting screw 35 swiveled in arm 36 of fixed bracket 37.

The meter platform 16 is supported from the beam member 24 by post 40 fastened to the platform at 41 and having its conical lower end 42 set in a recess in plate 43 of the bracket arm 44 carried by the member 24.

The platform 16 and the rack 22 are constrained to substantially vertical movements, the pinion 21 having tooth connection with the teeth of the rack permitting slight horizontal movement of the rack due to the arcuate movement of the supporting pivots 25, 26. The indicator needle 14 may be accurately set to the zero of the outer scale 7 by adjustment of the threaded screw 35 correspondingly regulating the position of the needle.

This apparatus lends itself to very rapid operation in measuring, for instance, the liquid contents of partly empty bottles in a bar or the like. Usually the weight of the empty bottle and closure, tare, is known or appears on the bottle label. With one hand, the operator places the bottle on the platform 16 while with the other hand he adjusts the pointer 10 to this tare on the scale 7. Then as the weight of the bottle is released, the needle moves to the fluid content of the bottle and this is read off, the operation being rapidly repeated to give a closely accurate inventory of the amounts of liquid in the opened bottles.

While the invention has been described in connection with a specific embodiment thereof, it is not intended to be confined thereto but covers such modifications thereof as fall within the scope of the appended claim.

I claim:

A weighing meter for liquids in a container comprising a casing enclosing a weighing mechanism and having a front vertical panel with a central opening, a bearing having an intermediate portion and reduced end portions, one of said end portions fitted into said front panel and having a turned edge to clamp said intermediate portion against said panel and securely fasten the bearing to the panel, an outer disc-shaped panel mounted on the other reduced end of said bearing and spaced from said front panel by said intermediate portion, said disc-shaped panel being rigidly secured to the bearing by a turned edge pressing said panel against said intermediate portion, a disc-shaped dial with a peripheral scale rotatably mounted on said intermediate portion between said outer panel and the front panel, a shaft journaled in said bearing and extending from in front of said outer panel to the rear of said front panel, means for turning said shaft on actuation of said weighing mechanism, a pointer attached to the outer end of said shaft and extending to said scale, an outer ring-shaped mounting having a cylindrical side extending outwardly from said front panel and an annular face with a stationary scale graduated to correspond with the tare of the container, said mounting being positioned concentric with said disc-shaped panel and dial and having a slot in the cylindrical side, a pointer attached to said disc-shaped dial and extending through said slot in said ring mounting and bent around with a pointer portion adjacent to said scale on said mounting, said pointer adjusting said scale on said mounting for the tare of the container.

JOHN LINDSTROM.

References Cited in the file of this patent

UNITED STATES PATENTS

| Number | Name | Date |
|---|---|---|
| D. 153,076 | Otto | Mar. 15, 1949 |
| 967,194 | Hopkinson | Aug. 16, 1910 |
| 1,436,319 | Macholl | Nov. 21, 1922 |
| 1,628,781 | Jaenichen | May 17, 1927 |
| 1,682,506 | Hansen | Aug. 28, 1928 |
| 1,902,233 | Hanssen | Mar. 21, 1933 |
| 2,237,653 | Chatillon | Apr. 8, 1941 |
| 2,559,493 | Bird | July 3, 1951 |